United States Patent Office 3,570,295
Patented Mar. 16, 1971

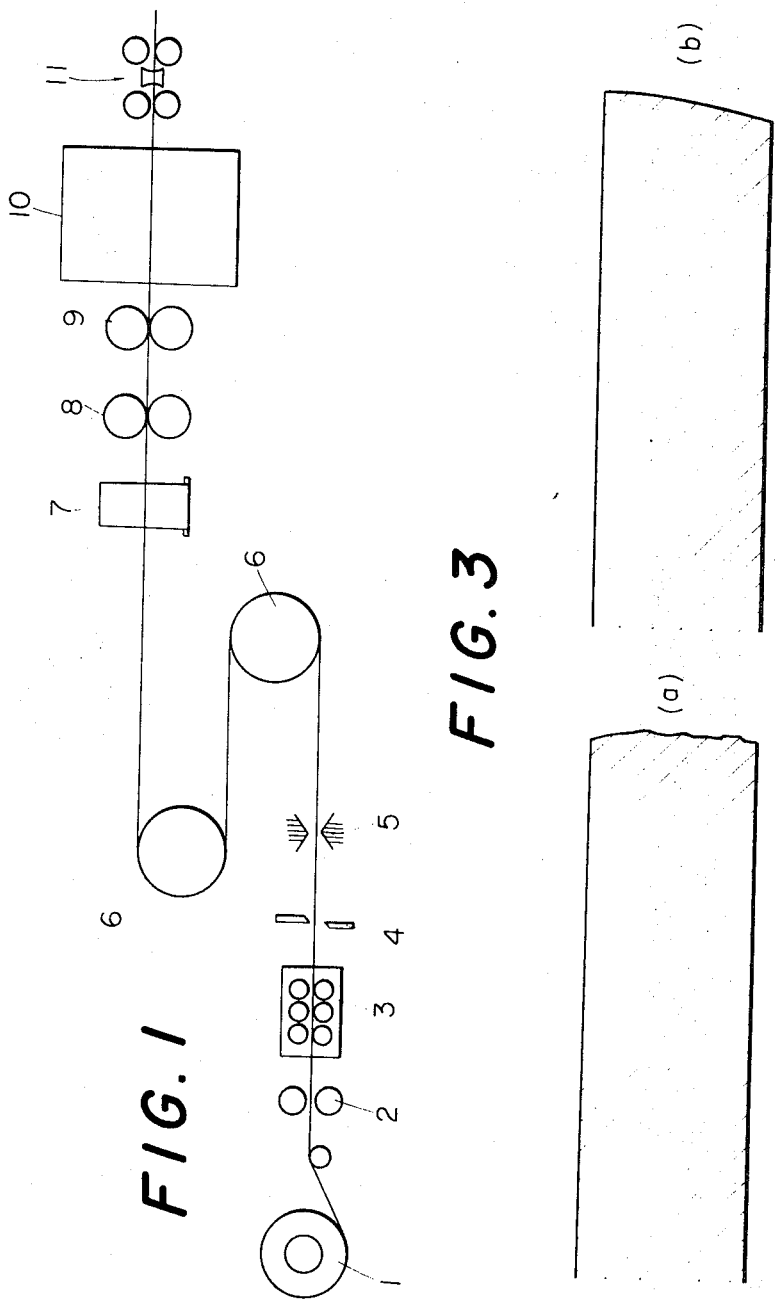

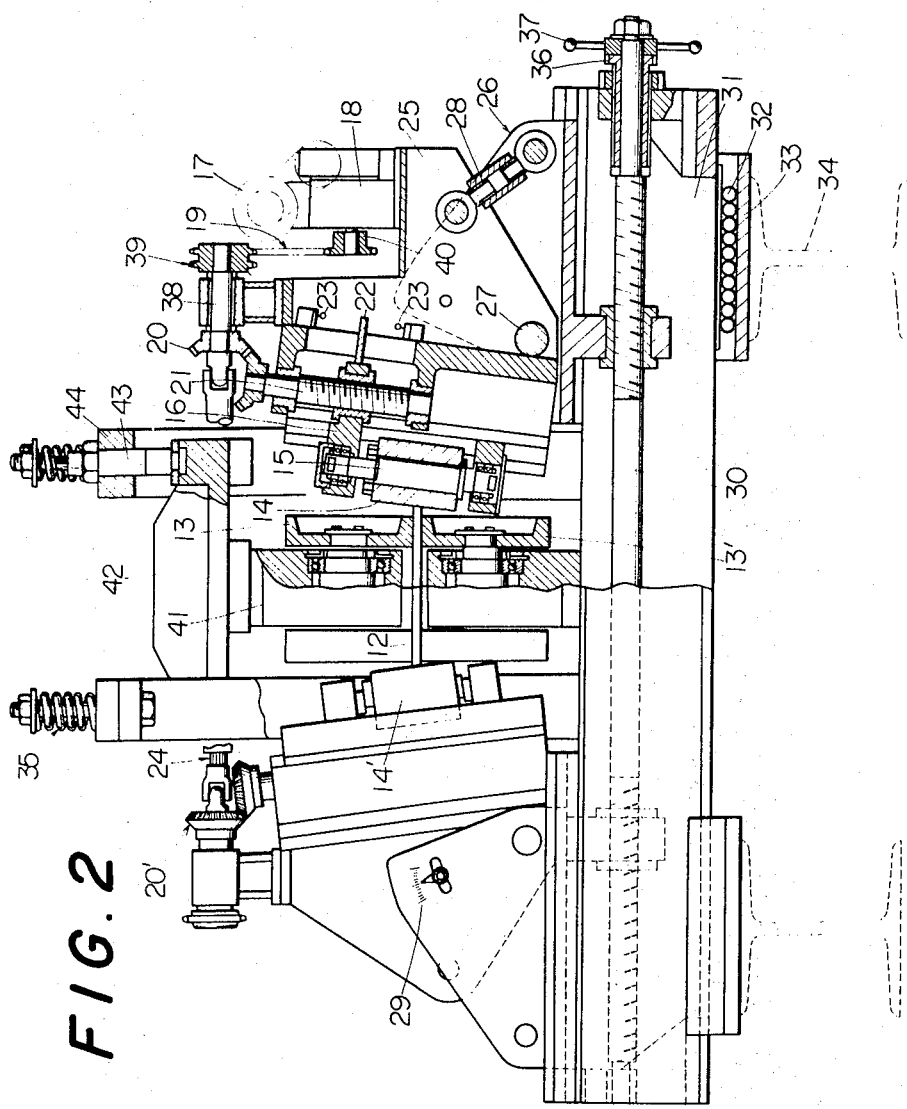

3,570,295
SKELP WEDGE FORMING METHOD AND DEVICE FOR FORGE WELDED STEEL TUBE
Itsuo Hirose, Hidenori Horii, Kazuo Konishi, Kenichi Matsumoto, and Tetsuo Sata, Kawasaki-shi, Japan, assignors to Nippon Kokan Kabushiki Kaisha
Filed Sept. 17, 1968, Ser. No. 760,194
Claims priority, application Japan, Oct. 21, 1967, 42/67,628
Int. Cl. B21b *13/12*
U.S. Cl. 72—234
10 Claims

ABSTRACT OF THE DISCLOSURE

Skelp edge forming method and device wherein a skelp is fed through pressure rollers while edging rollers contact and form the edges of the skelp when the skelp is in its cold condition. The edge rollers are reversibly moved in an up and down direction during the skelp edge forming.

---

This invention relates to a skelp edge forming method and device to be employed in the production of the forge-welded steel tubes, in which the edge portion of the skelp (blank plate) and the width thereof are precisely formed or determined so that the forge-welding of the skelp is thereby allowed to be carried out in the most effective manner.

Heretofore, in a shop furnishing the skelp, for instance, as a band steel, the skelp is formed merely by an edger-roll while it is still hot, and in a shop furnishing the skelp formed in a cold working process, the skelp is simply cut from plate material by means of a slitter. In both of these cases, no particular measures for obtaining higher accuracy in the edge configuration and in the width thereof have been taken.

As a result, the width of the skelp furnished from the band steel production shop generally varied in a wide range because of the hot processing condition, and the forge-welding carried out with such skelps turned out to be irregular, rendering an uneven strength distribution along the welded portion. Since the edges of the skelps in this case are formed by means of edger-rolls in a hot condition, the edges of the skelps cannot be sufficiently sharp and when such edges of the skelps are forge-welded together, the removal of the scale was found to be very difficult.

On the other hand, the width of the skelps furnished from the slitter shop also varied in a wide range due to the deflection of the cutters of the slitting machine, and such variation of width resulted in unsatisfactory forge-welding between the edges of the skelps. Moreover, because of the cutters not being sufficiently sharp, drooping in the cut edges and thinning in the adjacent skelp portion were obtained, and in some cases where the gaps of the cutters are not adjusted properly, the angle of the inclined cut edges may be varied. The above described problem of removing scale also exists when using these types of skelps.

Because of these and other irregularities and difficulties, the skelp edges obtained from the both of the shops could not be abutted satisfactorily, and the quality of the forge-welded portions was inferior. When the skelp thus welded is rolled into the tube, the forge-welded portion of the skelps was made thinner than the other portion thereof, and various difficulties such as lowering of strength of the welded portions due to the unsatisfactory rising up of beads on the inside surface have been experienced.

Therefore, the object of the present invention is to overcome the above described shortcomings due to the blank skelps employed in production of the forge-welded tubes, and to obtain sufficiently precise measurement of the blank and the desired configuration of the edge portion thereof in a cold condition as a step included in the tube production process.

The invention will now be more fully described on its preferred embodiment in conjunction with the accompanying drawings in which FIG. 1 is a schematic diagram showing the process of producing the forge-welded steel tube wherein the device according to the present invention is utilized;

FIG. 2 is a front elevational view of the skelp edge forming device according to the present invention, the right-hand side thereof showing the device in section; and FIG. 3(*a*) and FIG. 3(*b*) respectively illustrate an enlarged sectional view showing the skelp edge before and after it is formed by the device according to this invention.

In FIG. 1 illustrating schematically a diagram showing the process for producing the forge-welded steel tube starting from a coiled reel 1 to a forge-welding machine 11, the skelp edge forming device 7 according to the present invention is placed between a looper 6 and a second pinch roll 8. The blank skelp is furnished from the coiled reel 1 through a first pinch roll 2, a leveler 3, a pair of cutters 4, a flash welder 5, a looper 6, the edge forming device 7, a second pinch roll 8, a loading device 9, and a heating furnace 10, to the forge-welding machine 11.

FIG. 2 illustrates in detail a skelp edge forming device 7 according to the invention, wherein the skelp 12 is shifted perpendicular to the surface of the drawing, pushed into place by the upper and lower pushing rolls 13, 13', and both of the edges of the skelp are formed by the upset rolls 14, 14' which are pressing the edges from either of the sides. The roll 14 is fixed on a shaft 15 rotatably supported by a bracket 16. For the purpose of elongating the service life of the rolls 14, 14', the rolls are made movable up-and-down so that the whole surface of the rolls 14, 14' may contact the skelp edges. The up-and-down movement of the rolls 14, 14' is accomplished through a speed converter 18, chain 19, a couple of bevel gears 20, a vertical screw shaft 21 and a driving motor 17. The vertical movement of the rolls 14, 14' is continued repeatedly throughout the operation of the edge forming device 7, and the variation of the moving direction is obtained by a limit switch operating lever 22 coupled to the bracket 16. When this limit switch operating lever 22 operates the upper and lower limit switches 23, the driving motor 17 changes its rotating direction. The driving of the other side roll 14' is performed in the same manner through a connecting shaft 24 and a couple of bevel gears 20'.

Since it is required that the angle between the two side edges of the skelp 12 is adjusted to a suitable value corresponding to the size of the tubes to be produced, the skelp edge forming device 7 is provided with a roll angle adjusting device. An angle adjusting bed 25 supporting the roll 14 is pivotally supported by a pair of slidable beds 26 located at the right and left-hand sides of the apparatus by means of a pivot 27. The reference numeral 28 designates an angle adjusting turnbuckle, and turning the turnbuckle 28 the angle between both side edges of the skelp 12 may be changed to the required value with reference to the scale plate 29.

The pair of slidable beds 26 located at the right and left-hand sides are mounted on a horizontally slidable bed 31 so that the distance between the slidable beds 26 (and therefore, the distance between rolls 14 and 14'); may be adjusted by means of a roll distance adjusting screw 30. The horizontally slidable bed 31 can be slid on a ball retaining bed 33 right or leftward when the balls 32 rotate. The ball retaining bed 33 is fixedly mounted on the frame 34 of the device. By virtue of this construction, the device can adapt to the deflection of the path of the skelp which is caused by segregation or irregularities in the thickness of the blank skelp.

As a countermeasure to the cases where irregularities in the thickness of the skelp such as abnormally rising beads at the junction of the skelps pass through the upper and lower rolls 13, a pair of roll suppressing springs 35 are provided, and by the buffer action of these springs, the rolls 13 are protected from the damage caused by these irregularities.

The initial setting or adjustment for the width of the skelp to be passed through the skelp edge forming device 7 can be achieved by means of the screw shaft 30 and adjusting screw 36 combination which is operated by turning a handle 37.

Furthermore, a bevel-gear shaft 38, a chain wheel 39, another chain wheel 40 for the purpose of providing speed reduction, an upper roll bracket 41, an upper roll hanger 42, a pair of upper roll pressure adjusting screws 43, and a pair of caps 44 are provided.

FIG. 3(a) illustrates the configuration of the skelp before it is formed by the forming device and after it is slit from the coiled blank. FIG. 3(b) illustrates the skelp configuration after the skelp edge is formed by the above described forming device according to the present invention. The results of tests performed on the forge-welded portions obtained when using the above described two skelps are given in the following table.

TABLE

| Items | Flatness, percent | Widening, percent | Outward notch, mm. | No good abutment, percent | ECD failed (eddy current detection), percent |
|---|---|---|---|---|---|
| After edges are formed | 82 | 133 | 0.05 | 2.0 | 1.5 |
| Before edges are formed | 65 | 125 | 0.15 | 5.0 | 7.0 |
| Difference | 17 | 8 | 0.10 | 3.0 | 5.5 |

Besides the superior effects of the present invention as indicated in the above table, the fact that it can decrease the bitten foreign materials (dross) is a significant merit of this invention which is obtained from the characteristic features of the novel mechanism. Above all, the construction of the upset rolls 14, 14' wherein an up-and-down motion thereof is repeated during the operation of this device to prevent local wear of the roll surface can provide the assurance of sharp and regular surfaces on the thus formed edges of the skelp, this feature largely contributing to the improvement of the result of the forge-welding of the skelp edges.

Moreover, the angle between the both side edges can be arbitrarily determined by rotating the roll-housing in a vertical plane with reference to the scale plate 29, whereby the optimum configuration of the skelp edges can be formed. The double construction of the roll-housing beds also enables a free sliding movement of these beds in the lateral direction by means of the rotatable balls, thus providing an improvement in the precision of the width of the skelp that can be thereby attained.

The present invention may possibly be applied not only to the above described production of forge-welded tubes, but also to the production of electric seam-welded-and-forged tubes, and where the cold homing plate and the like are utilized, in which the precision in dimensions of the width and the edge configuration provided by the present invention are essential.

We claim:

1. Apparatus for forming the edges of skelp comprising:

upper and lower pressure rollers between which a skelp is fed;
first and second edging rollers for contacting and forming the sides of skelp fed between said pressure rollers; and
means for moving said edging rollers, during passage of said skelp therebetween, reversibly in an up and down direction in a plane substantially perpendicular to the direction of movement of said skelp through said pressure rollers.

2. Apparatus as claimed in claim 1, wherein said edging rollers are inclined relative to the flat surfaces of said skelp.

3. Apparatus as claimed in claim 2, including means for varying the angle of inclination of said edging rollers.

4. Apparatus as claimed in claim 2, wherein at least one of said edging rolls is pivotable about an axis substantially parallel to the direction of movement of said skelp through said pressure rollers.

5. Apparatus as claimed in claim 1, wherein said moving means comprises a motor coupled to drive said edging rollers, and limit switches at the extremities of the path of movement of said edging rollers, said limit switches being coupled to said motor for reversing the direction of drive to said edging rollers.

6. Apparatus as claimed in claim 1, further including means for varying the distance between said edging rollers.

7. Apparatus as claimed in claim 6, wherein said distance varying means includes first and second base members on which said edging rollers are respectively mounted, and adjusting screw means for moving said base members with respect to each other to vary the distance between said edging rollers.

8. Apparatus as claimed in claim 7, wherein said apparatus includes a frame means, and further comprising ball-bearing means mounting said base members to said frame means.

9. A skelp edge forming method comprising:

feeding said skelp in a flat condition;
forming the side edges of said skelp as it is fed in said flat condition by means of edging rollers contacting said side edges; and
moving said edging rollers reversibly in an up and down direction in a plane substantially perpendicular to the direction of movement of said fed skelp.

10. A method as claimed in claim 9 comprising varying the angle of inclination of said edging rollers relative to said skelp.

References Cited

UNITED STATES PATENTS

| 1,650,607 | 11/1927 | Cook | 72—235 |
| 2,090,706 | 8/1937 | Sheperdson | 72—177 |
| 2,201,214 | 5/1940 | Yoder | 72—247X |
| 2,353,289 | 7/1944 | Bennewitz | 72—235X |
| 2,183,388 | 12/1939 | Biggert, Jr. | 72—234X |
| 2,195,502 | 4/1940 | Smitmans | 72—249X |

MILTON S. MEHR, Primary Examiner